US008038154B2

(12) United States Patent
De La Peña

(10) Patent No.: US 8,038,154 B2
(45) Date of Patent: Oct. 18, 2011

(54) METHOD TO PLAY A POKER GAME

(75) Inventor: Luis Fernando De La Peña, Bogota (CO)

(73) Assignee: John J Martinez, Croton On Hudson, NY (US)

( * ) Notice: Subject to any disclaimer, the term of this patent is extended or adjusted under 35 U.S.C. 154(b) by 105 days.

(21) Appl. No.: 12/646,911

(22) Filed: Dec. 23, 2009

(65) Prior Publication Data

US 2010/0084818 A1 Apr. 8, 2010

Related U.S. Application Data

(63) Continuation-in-part of application No. 12/143,777, filed on Jun. 21, 2008.

(51) Int. Cl.
*A63F 13/00* (2006.01)
*A63F 1/00* (2006.01)

(52) U.S. Cl. ............ 273/292; 273/303; 463/13; 463/14

(58) Field of Classification Search ................. 273/292; 463/13

See application file for complete search history.

(56) References Cited

U.S. PATENT DOCUMENTS

| | | | |
|---|---|---|---|
| 5,732,950 A | 3/1998 | Moody | |
| 6,132,311 A | 10/2000 | Williams | |
| 6,146,271 A | 11/2000 | Kadlic | |
| 6,220,959 B1 | 4/2001 | Holmes, Jr. | |
| 6,474,646 B1 | 11/2002 | Webb | |
| 7,044,468 B2 * | 5/2006 | Sklansky et al. | 273/292 |
| 2003/0122305 A1 | 7/2003 | Malcolm | |
| 2004/0102234 A1 * | 5/2004 | Gold | 463/13 |
| 2006/0108740 A1 * | 5/2006 | Kekempanos et al. | 273/292 |
| 2006/0181026 A1 * | 8/2006 | Wong | 273/292 |
| 2007/0037623 A1 | 2/2007 | Romik | |

* cited by examiner

*Primary Examiner* — Gene Kim
*Assistant Examiner* — Michael Dennis
(74) *Attorney, Agent, or Firm* — John J. Martinez; Martinez Patents PC

(57) ABSTRACT

The present invention provides a poker game playing method wherein multiple five-card hands from once previously shuffled 52-card poker deck can be played without increasing probabilities against a casino, while maintaining maximum entertainment value, and with immediate certainty of winning or losing. The method of the present invention maximizes entertainment value derived from the poker deck by rewarding a gambler with free five-card hands when there had been five-card hand winning combinations, wherein the rewarding free five-card hands are from the remaining un-played cards of said same poker deck, thus, without increasing chances against a casino or gaming house, and wherein a gambler may have a false impression of increased probabilities in his favor because of the rewarding free five-card hands, therefore increasing his gambling desire to start anew waging against newly shuffled 52-card poker decks.

10 Claims, 3 Drawing Sheets

FIG. 2

CA$H POKER

Your luck is the only thing that counts

PAYOUT SCHEDULE

| | |
|---|---|
| ROYAL FLUSH | 100 TO 1 |
| STRAIGHT FLUSH | 75 TO 1 |
| POKER | 50 TO 1 |
| FULL HOUSE | 7 TO 1 |
| FLUSH | 6 TO 1 |
| STRAIGHT | 5 TO 1 |
| THREE OF A KIND | 3 TO 1 |
| TWO PAIR | 2 TO 1 |
| PAIR OF JACKS OR BETTER | 1 TO 1 |
| PAIR TEN OR LESS | TIE |
| NO GAME | LOST |

METHOD TO PLAY A POKER GAME

CROSS-REFERENCE TO RELATED APPLICATIONS

This application is a continuation in part of U.S. patent application Ser. No. 12/143,777 filed on Jun. 21, 2008, pending, of which the entire contents are herein incorporated by reference.

BACKGROUND OF THE INVENTION

1. Field of the Present Invention

The field of the present invention relates to a method of playing a poker game wherein a 52-card deck entertainment value is maximized without increasing the probabilities against a gaming house or casino.

2. Description of the Prior Art

Ways or methods to play a poker game are many. However, there is no description of playing multiple five-card hands from just one previously shuffled 52-card poker deck, wherein the probabilities against a casino do not increase, while maintaining maximum entertainment value.

By way of example, U.S. Pat. No. 6,638,163 to Moody describes a poker game that start with a poker deck, and an incentive component derived from a complete newly shuffled poker deck, thus, renewing or duplicating the gambler probabilities against a casino. Other examples are U.S. Patent Application No. 20060267283A1 by Jackson, U.S. Pat. No. 5,908,353 to Andrews, U.S. Pat. No. 5,845,907 to Wells, U.S. Patent Application No. 20060157936A1 by Moody, U.S. Pat. No. 6,131,907 to Nucifora, etc.

The present invention provides a poker game playing method that overcomes the mentioned limitations of the prior art.

SUMMARY OF THE INVENTION

The present invention provides a poker game playing method wherein multiple five-card hands from once previously shuffled 52-card poker deck can be played without increasing probabilities against a casino, while maintaining maximum entertainment value, and with immediate certainty of winning or losing. The method of the present invention maximizes entertainment value derived from the poker deck by rewarding a gambler with free five-card hands when there had been five-card hand winning combinations, wherein the rewarding free five-card hands are from the remaining unplayed cards of said same poker deck, thus, without increasing chances against a casino or gaming house, and wherein a gambler may have a false impression of increased probabilities in his favor because of the rewarding free five-card hands, therefore increasing his gambling desire to start anew waging against newly shuffled 52-card poker decks.

More specifically, the present invention provides a method of playing a poker game on a gaming machine with a video screen, wherein the method comprises:

A) A player starting a game by making wagers to play a facedown five-card hand from a once previously shuffled 52-card poker deck, wherein the player can play between one and ten facedown five-card hands from said same 52-card poker deck, wherein the player makes a wager for each facedown five-card hand, and wherein the wager for a facedown five-card hand can be different from the wagers for the other facedown five-hand cards;

B) The Machine Dealing to the player between one and ten facedown five-card hands from said same 52-card poker deck;

C) Opening the five-card hands from said same 52-card poker deck;

D) Determining the poker hand ranking of each one of the five-card hands;

A) If any of the five-card hands is a winning combination, awarding the player a pre-established winning amount based on the amount of the wager for each five-card hand;

and wherein, if any of the five-card hands is a winning combination above three of a kind and if there are remaining cards from said same poker deck, rewarding to the player another five card hand for each winning combination, wherein the remaining cards from said same deck could be 47 if one initial five-card hand was played, 42 if two initial five-card hands were played, 37 if three initial five-card hands were played, 32 if four initial five-card hands were played, 27 if five initial five-card hands were played, 22 if six initial five-card hands were played; 17 if seven initial five-card hands were played; 12 if eight initial five-card hands were played; 7 if nine initial five-card hands were played, wherein if there are less number of remaining cards than the cards needed to reward several concomitant winning combination the player is rewarded with just the maximum possible five-card hands from the remaining cards based on which winning combinations have the highest ranking, wherein if there is a rewarding five-card hand winning combination, the player is rewarded according to a pre-established winning amount based on the amount of the original wager for the original five-card hand, wherein the game is over when there are no winning combinations; and wherein the game is also over when there are just two remaining cards from said same card deck.

In one aspect of the method of the present invention, the rewarding five card-hands are taken from the no more shuffled remaining cards of said same poker deck.

In one additional option of the method of the present invention, the five-card hands from the same 52-card poker deck are opened.

In one more aspect of the method of the present invention, the method is implemented in the gaming machine by means of a software program.

In another aspect of the method of the present invention, the machine is a computer.

In one of the variations of the present invention, the gaming machine is a server on the world wide web (WWW) and the video screen is on a computer terminal connected to the WWW.

In one more of the variations of the present invention, the game can be played on a table, wherein role of the gaming machine is taken by a dealer. In one aspect of the present invention, more than one player participate in the game, wherein the game starts when there is wagers for at least two facedown five-card hands from the same 52-card poker deck, wherein more than one player make wagers to play between two and ten concurrent facedown five-card hands from the same 52-card poker deck, wherein there is a wager for each facedown five-card hand from the same 52-card poker game, and wherein the wager for a facedown five-card hand can be different from the wagers for the other facedown five-hand cards. In one option of the method of the present invention, the five-card hands from the same 52-card poker deck are opened.

In a second embodiment, the present invention is a method of playing a poker game on a gaming machine with a video screen, wherein the method comprises:

A) A player starting a game by making wagers to play at least two facedown five-card hands from the same 52-card poker deck, wherein the player can play between two and ten facedown five-card hands from the same 52-card poker deck, wherein the player makes a wager for each facedown five-card hand, and wherein the wager for a facedown five-card hand can be different from the wagers for the other facedown five-hand cards;

B) A dealer Dealing to the player between two and ten facedown five-card hands from the same 52-card poker deck;

C) Opening the five-card hands from the same 52-card poker deck;

D) Determining the poker hand ranking of each one of the five-card hands;

A. If any of the five-card hands is a winning combination, awarding the player a pre-established winning amount based on the amount of the wager for each five-card hand;

and wherein, if any of the five-card hands is a winning combination above three of a kind and if there are remaining cards from said same poker deck, rewarding to the player another five card hand for each winning combination, wherein the remaining cards from said same deck could be 47 if one initial five-card hand was played, 42 if two initial five-card hands were played, 37 if three initial five-card hands were played, 32 if four initial five-card hands were played, 27 if five initial five-card hands were played, 22 if six initial five-card hands were played; 17 if seven initial five-card hands were played; 12 if eight initial five-card hands were played; 7 if nine initial five-card hands were played, wherein if there are less number of remaining cards than the cards needed to reward several concomitant winning combination the player is rewarded with just the maximum possible five-card hands from the remaining cards based on which winning combinations have the highest ranking, wherein if there is a rewarding five-card hand winning combination, the player is rewarded according to a pre-established winning amount based on the amount of the original wager for the original five-card hand, wherein the game is over when there are no winning combinations; and wherein the game is also over when there are just two remaining cards from said same card deck.

In an aspect of the second embodiment of the method of the present invention, the rewarding five card-hands are taken from the no more shuffled remaining cards of said same poker deck.

In one option of the second embodiment of the present invention, the five-card hands from the same 52-card poker deck are opened.

In one aspect of the second embodiment of the method of the present invention, the method is implemented in the gaming machine by means of a software program.

In another aspect of the second embodiment of the method of the present invention, the machine is a computer.

In one of the variations of the second embodiment of the present invention, the gaming machine is a server on the world wide web (WWW) and the video screen is on a computer terminal connected to the WWW.

In one more of the variations of the second embodiment of the present invention, the game can be played on a table, wherein role of the gaming machine is taken by a dealer. In one aspect of the second embodiment of the present invention, more than one player participate in the game, wherein the game starts when there is wagers for at least two facedown five-card hands from the same 52-card poker deck, wherein more than one player make wagers to play between two and ten concurrent facedown five-card hands from the same 52-card poker deck, wherein there is a wager for each facedown five-card hand from the same 52-card poker game, and wherein the wager for a facedown five-card hand can be different from the wagers for the other facedown five-hand cards. In one option of the second embodiment of the method of the present invention, the five-card hands from the same 52-card poker deck are opened.

Objectives and additional advantages of the present invention will become more evident in the description of the figures, the detailed description of the invention and the claims.

BRIEF DESCRIPTION OF THE DRAWINGS

FIG. 2 shows the ranking table for five-card hand winning combinations.

DETAILED DESCRIPTION OF THE INVENTION

Figure 1:
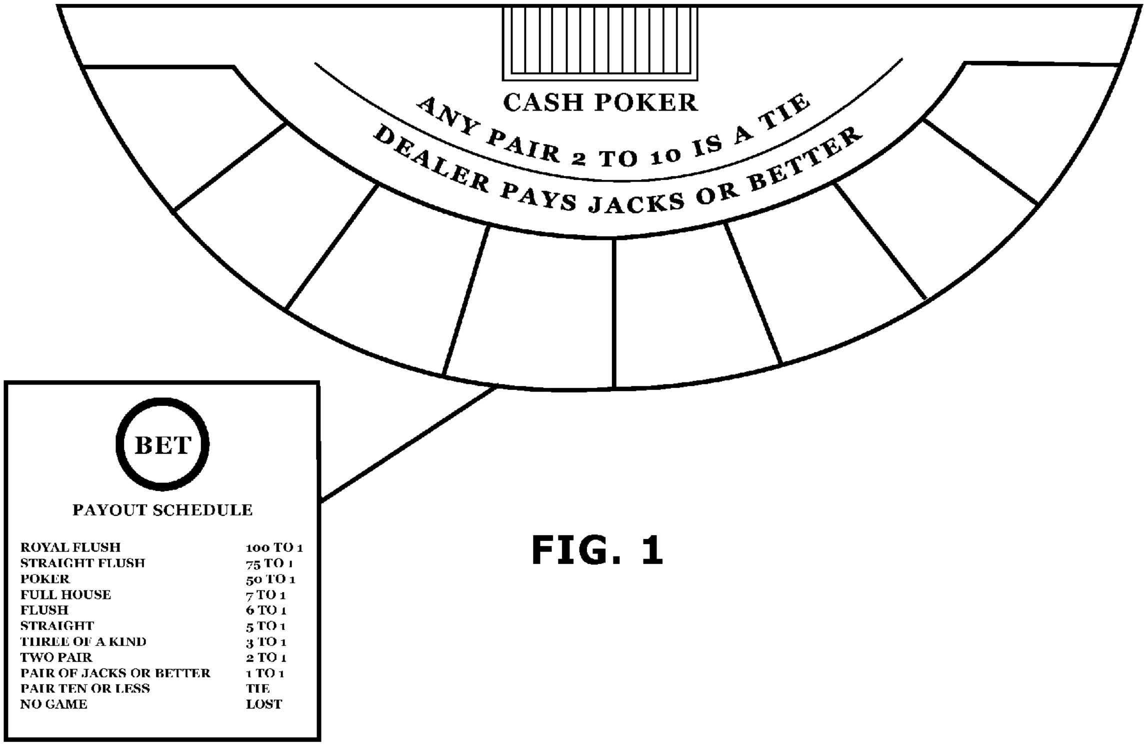
FIG. 1 shows a gaming table where the poker game can be played applying the method of the present invention, wherein the table is configured for up to seven five-card hands from a previously shuffled 52-card poker deck.

FIG. 1 shows a gaming table where the poker game can be played applying the method of the present invention. Although in FIG. 1, the gaming table is configured in a preferred way for 7 five-card winning combinations out of one previously shuffled 52-card poker deck, in other embodiments of the present invention, the table can be configured for up to 5, for up to 10, etc. five-card hands from a previously shuffled 52-card poker deck. Likewise, in a preferred way, a player can play between one and seven five card hands from the same deck in a gaming machine with a video screen.

FIG. 2 shows the preferred ranking table for five-card hand winning combinations. However, other ranking tables can be used for five-card hand winning combinations.

In no case, a pair is defined under this application as a winning combination. A pair is a tie, which entitles the player reimbursement of the wage, but a pair DO NOT mean that the player receives as incentive an additional rewarding free five-card hand from the remaining cards of the same poker deck from which the original five-card hand wage was made. In contrast, as explained below, a five-card winning combination results in a free rewarding five-card hand if there are available cards from the same poker deck from which the original five-card hand wage was made. By defining a pair as a tie, a gambler stays motivated to keep playing by making new wages against new previously shuffled 52-card poker decks; and by not defining a pair as a winning combination, probabilities against the casino do not increase. In other words, the method of the present invention maintains the motivation of the gambler without increasing odds against a gaming house or casino. In another version of the present invention, even if there is no incentive for a pair, a pair of eight or higher par may pay twice the initial wage. In another version even if there is no incentive a pair of jacks or higher par may pay twice the initial wage.

TABLE 1

| Hand | Frequency | Probability | Cumulative | Odds |
|---|---|---|---|---|
| Straight flush | 40 | 0.00154% | 0.00154% | 64,973:1 |
| Four of a kind | 624 | 0.0240% | 0.0256% | 4,164:1 |
| Full house | 3,744 | 0.144% | 0.170% | 693:1 |
| Flush | 5,108 | 0.197% | 0.367% | 508:1 |
| Straight | 10,200 | 0.392% | 0.76% | 254:1 |
| Three of a kind | 54,912 | 2.11% | 2.87% | 46.3:1 |
| Two pair | 123,552 | 4.75% | 7.62% | 20.0:1 |
| One pair | 1,098,240 | 42.3% | 49.9% | 1.37:1 |
| No pair | 1,302,540 | 50.1% | 100% | 0.995:1 |
| Total | 2,598,960 | 100% | 100% | 0:1 |

Table 1 enumerates the frequency of each hand, given all combinations of five-card hands randomly drawn from a full deck of 52 without replacement. Wild cards are not considered. The probability of drawing a given hand is calculated by dividing the number of ways of drawing the hand by the total number of 5-card hands (the sample space, $$\binom{52}{5} = 2{,}598{,}960$$

five-card hands). The odds are defined as the ratio (1/p)−1:1, where p is the probability. (The frequencies given are exact; the probabilities and odds are approximate.) Once cards are drawn from a 52-card poker deck, the probabilities of a five-card hand winning combination diminish for the un-drawn remaining cards of the same deck due to the effect of retiring drawn cards from the deck, wherein said retired cards are no more available to be part of a possible winning combination.

More specifically, the present invention provides a method of playing a poker game on a gaming machine with a video screen, wherein the method comprises:

E) A player starting a game by making wagers to play a facedown five-card hand from a once previously shuffled 52-card poker deck, wherein the player can play between one and ten facedown five-card hands from said same 52-card poker deck, wherein the player makes a wager for each facedown five-card hand, and wherein the wager for a facedown five-card hand can be different from the wagers for the other facedown five-hand cards;

F) The Machine Dealing to the player between one and ten facedown five-card hands from said same 52-card poker deck;

G) Opening the five-card hands from said same 52-card poker deck;

H) Determining the poker hand ranking of each one of the five-card hands;

B) If any of the five-card hands is a winning combination, awarding the player a pre-established winning amount based on the amount of the wager for each five-card hand;

and wherein, if any of the five-card hands is a winning combination above three of a kind and if there are remaining cards from said same poker deck, rewarding to the player another five card hand for each winning combination, wherein the remaining cards from said same deck could be 47 if one initial five-card hand was played, 42 if two initial five-card hands were played, 37 if three initial five-card hands were played, 32 if four initial five-card hands were played, 27 if five initial five-card hands were played, 22 if six initial five-card hands were played; 17 if seven initial five-card hands were played; 12 if eight initial five-card hands were played; 7 if nine initial five-card hands were played, wherein if there are less number of remaining cards than the cards needed to reward several concomitant winning combination the player is rewarded with just the maximum possible five-card hands from the remaining cards based on which winning combinations have the highest ranking, wherein if there is a rewarding five-card hand winning combination, the player is rewarded according to a pre-established winning amount based on the amount of the original wager for the original five-card hand, wherein the game is over when there are no winning combinations; and wherein the game is also over when there are just two remaining cards from said same card deck.

In one aspect of the method of the present invention, the rewarding five card-hands are taken from the no more shuffled remaining cards of said same poker deck.

In one additional option of the method of the present invention, the five-card hands from the same 52-card poker deck are opened.

In one more aspect of the method of the present invention, the method is implemented in the gaming machine by means of a software program.

In another aspect of the method of the present invention, the machine is a computer.

In one of the variations of the present invention, the gaming machine is a server on the world wide web (WWW) and the video screen is on a computer terminal connected to the WWW.

In one more of the variations of the present invention, the game can be played on a table, wherein role of the gaming machine is taken by a dealer. In one aspect of the present invention, more than one player participate in the game, wherein the game starts when there is wagers for at least two facedown five-card hands from the same 52-card poker deck, wherein more than one player make wagers to play between two and ten concurrent facedown five-card hands from the same 52-card poker deck, wherein there is a wager for each facedown five-card hand from the same 52-card poker game, and wherein the wager for a facedown five-card hand can be different from the wagers for the other facedown five-hand cards. In one option of the method of the present invention, the five-card hands from the same 52-card poker deck are opened.

In a second embodiment, the present invention is a method of playing a poker game on a gaming machine with a video screen, wherein the method comprises:

E) A player starting a game by making wagers to play at least two facedown five-card hands from the same 52-card poker deck, wherein the player can play between two and ten facedown five-card hands from the same 52-card poker deck, wherein the player makes a wager for each facedown five-card hand, and wherein the wager for a facedown five-card hand can be different from the wagers for the other facedown five-hand cards;

F) A dealer Dealing to the player between two and ten facedown five-card hands from the same 52-card poker deck;

G) Opening the five-card hands from the same 52-card poker deck;

H) Determining the poker hand ranking of each one of the five-card hands;

B. If any of the five-card hands is a winning combination, awarding the player a pre-established winning amount based on the amount of the wager for each five-card hand;

and wherein, if any of the five-card hands is a winning combination above three of a kind and if there are remaining cards from said same poker deck, rewarding to the player another five card hand for each winning combination, wherein the remaining cards from said same deck could be 47 if one initial five-card hand was played, 42 if two initial five-card hands were played, 37 if three initial five-card hands were played, 32 if four initial five-card hands were played, 27 if five initial five-card hands were played, 22 if six initial five-card hands were played; 17 if seven initial five-card hands were played; 12 if eight initial five-card hands were played; 7 if nine initial five-card hands were played, wherein if there are less number of remaining cards than the cards needed to reward several concomitant winning combination the player is rewarded with just the maximum possible five-card hands from the remaining cards based on which winning combinations have the highest ranking, wherein if there is a rewarding five-card hand winning combination, the player is rewarded according to a pre-established winning amount based on the amount of the original wager for the original five-card hand, wherein the game is over when there are no winning combinations; and wherein the game is also over when there are just two remaining cards from said same card deck.

In an aspect of the second embodiment of the method of the present invention, the rewarding five card-hands are taken from the no more shuffled remaining cards of said same poker deck.

In one option of the second embodiment of the present invention, the five-card hands from the same 52-card poker deck are opened.

In one aspect of the second embodiment of the method of the present invention, the method is implemented in the gaming machine by means of a software program.

Figure 3:
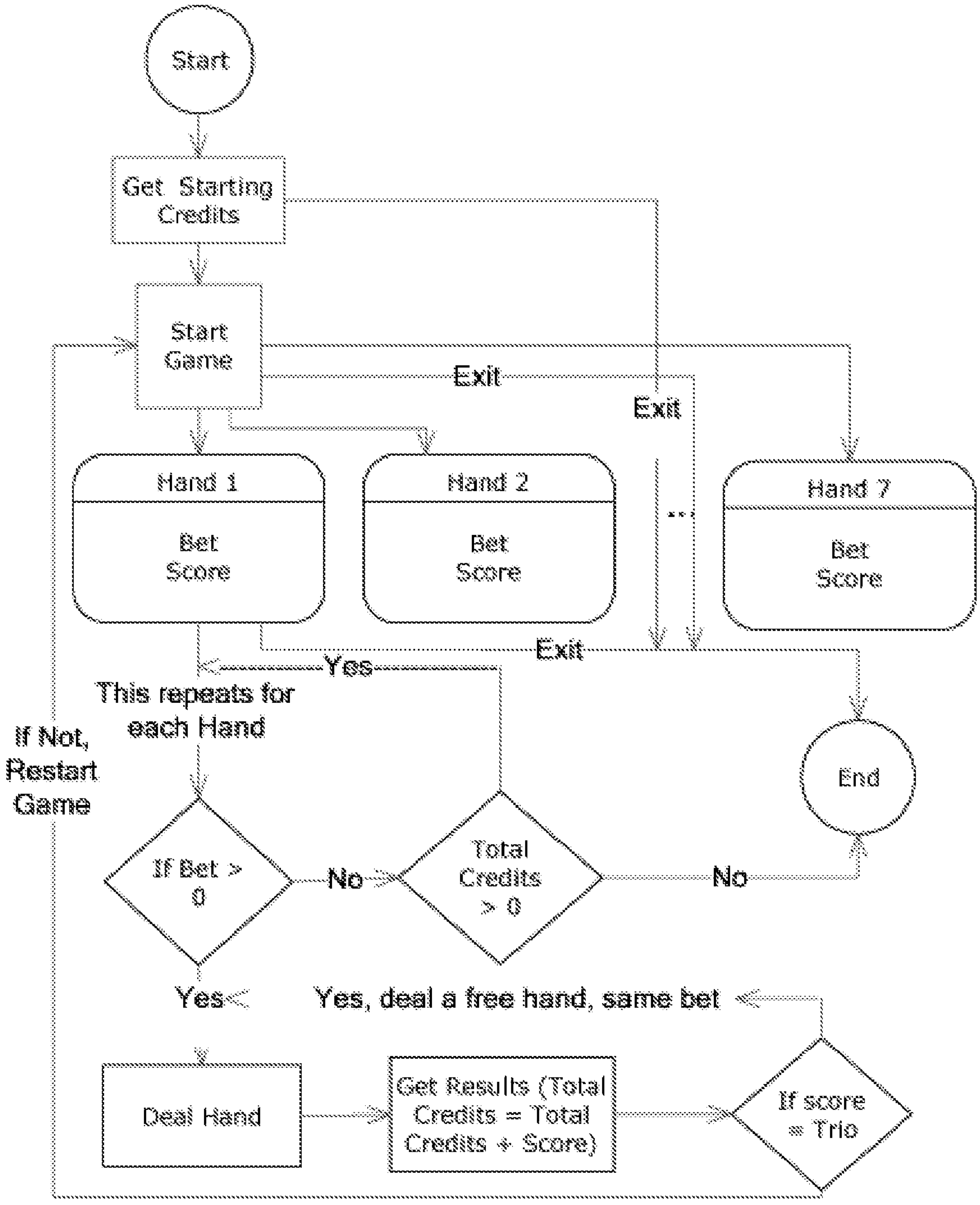
FIG. 3 shows a Flow of Diagrams representing the variables and their interaction, wherein the Flow of Diagrams is the base for a software to implement the method of the present invention on a gaming machine with a video screen.

In all the embodiments of the method of present invention, a preferred manner to implement the method in a gaming machine with a video screen is by means of a software program based in the Flow of Diagrams of FIG. 3., wherein said software is preferably written using Microsoft® Visual C#®. The written software is used to play the method of the present invention on a personal computer. However, Any other flowchart comprising all the elements of the method, and any other appropriate programming language to write said software may be used.

In another aspect of the second embodiment of the method of the present invention, the machine is a computer.

In one of the variations of the second embodiment of the present invention, the gaming machine is a server on the world wide web (WWW) and the video screen is on a computer terminal connected to the WWW.

In one more of the variations of the second embodiment of the present invention, the game can be played on a table, wherein role of the gaming machine is taken by a dealer. In one aspect of the second embodiment of the present invention, more than one player participate in the game, wherein the game starts when there is wagers for at least two facedown five-card hands from the same 52-card poker deck, wherein more than one player make wagers to play between two and ten concurrent facedown five-card hands from the same 52-card poker deck, wherein there is a wager for each facedown five-card hand from the same 52-card poker game, and wherein the wager for a facedown five-card hand can be different from the wagers for the other facedown five-hand cards. In one option of the second embodiment of the method of the present invention, the five-card hands from the same 52-card poker deck are opened.

In all possible embodiments of the present invention, it is possible that after multiple initial five-card hand wages from one previously shuffled 52-card poker deck, there is more five-card hands showing winning combinations, than remaining cards from the same deck to reward the five card winning combinations. For example, there may be 6 five card hands showing winning combinations, and in just 22 cards remaining from the same deck that will produce only 4 free rewarding five-card hands. In the example, the method of the present invention rule is to reward the 4 five-card hand winning combinations with the highest ranking, and the game is over. In other words, when there is more five-card hands showing winning combinations than rewarding free five-card hands possible out of the remaining cards left on the poker deck, only the highest five-card hand winning combinations will be rewarded with the possible free five-card hands left on the remaining cards of the same poker deck, and the game will be over. In this way, there is no possibility that the probabilities against a casino or gaming house are renewed by rewarding a gambler with new hands from another 52-card poker deck.

While the description presents the preferred embodiments of the present invention, additional changes can be made in the form and disposition of the parts without distancing from the basic ideas and principles comprised in the claims.

The invention claimed is:

1. A method of playing a poker game on a gaming machine with a video screen, wherein the method comprises:

A) A player starting a game by making wagers to play a facedown five-card hand from a once previously shuffled 52-card poker deck, wherein the player can play between one and ten facedown five-card hands from said same 52-card poker deck, wherein the player makes a wager for each facedown five-card hand, and wherein the wager for a facedown five-card hand can be different from the wagers for the other facedown five-hand cards;

B) The Machine Dealing to the player between one and ten facedown five-card hands from said same 52-card poker deck;

C) Opening the five-card hands from said same 52-card poker deck;

D) Determining the poker hand ranking of each one of the five-card hands;

E) If any of the five-card hands is a winning combination, awarding the player a pre-established winning amount based on the amount of the wager for each five-card hand; and wherein, if any of the five-card hands is a winning combination above three of a kind and if there are remaining cards from said same poker deck, rewarding to the player another five card hand for each winning combination, wherein the rewarding five card hands are taken from the remaining cards of said same unshuffled poker deck; wherein the remaining cards from said same deck could be 47 19 if one initial five-card hand was played, 42 if two initial five-card hands were played, 37 if three initial five-card hands were played, 32 if four initial five-card hands were played, 27 if five initial five-card hands were played, 22 if six initial five-card hands were played; 17 if seven initial five-card hands were played; 12 if eight initial five-card hands were played; 7 if nine initial five-card hands were played, wherein if there are less number of remaining cards than there are needed to reward several concomitant winning combination the player is rewarded with a maximum possible five-card hands from the remaining cards based on which winning combinations have the highest ranking, wherein if there is a rewarding five-card hand winning combination, the player is rewarded according to a pre-established winning amount based on an amount of the original wager for the original five-card hand, wherein the game is over when there are no winning combinations; and wherein the game is also over when there are just two remaining cards from said same card deck.

2. The method of claim 1, wherein the five-card hands from the same 52-card poker deck are opened.

3. The method of claim 1, wherein the method is implemented in the gaming machine by means of a software program.

4. The method of claim 1, wherein the machine is a computer.

5. The method of claim 1, wherein the gaming machine is a server on the world wide web (WWW) and the video screen is on a computer terminal connected to the WWW.

6. A method of playing a poker game on a gaming machine with a video screen, wherein the method comprises:

A) A player starting a game by making wagers to play at least two facedown five-card hands from the same 52-card poker deck, wherein the player can play between two and ten facedown five-card hands from the same 52-card poker deck, wherein the player makes a wager for each facedown five-card hand, and wherein the wager for a facedown five-card hand can be different from the wagers for the other facedown five-hand cards;

B) A dealer Dealing to the player between two and ten facedown five-card hands from the same 52-card poker deck;

C) Opening the five-card hands from the same 52-card poker deck;

D) Determining the poker hand ranking of each one of the five-card hands;

E) If any of the five-card hands is a winning combination, awarding the player a pre-established winning amount based on the amount of the wager for each five-card hand; and wherein, if any of the five-card hands is a winning combination above three of a kind and if there are remaining cards from said same poker deck, rewarding to the player another five card hand for each winning combination, wherein the rewarding five card hands are taken from the remaining cards of said same unshuffled poker deck; wherein the remaining cards from said same deck could be 47 19 if one initial five-card hand was played, 42 if two initial five-card hands were played, 37 if three initial five-card hands were played, 32 if four initial five-card hands were played, 27 if five initial five-card hands were played, 22 if six initial five-card hands were played; 17 if seven initial five-card hands were played; 12 if eight initial five-card hands were played; 7 if nine initial five-card hands were played, wherein if there are less number of remaining cards than there are needed to reward several concomitant winning combination the player is rewarded with a maximum possible five-card hands from the remaining cards based on which winning combinations have the highest ranking, wherein if there is a rewarding five-card hand winning combination, the player is rewarded according to a pre-established winning amount based on an amount of the original wager for the original five-card hand, wherein the game is over when there are no winning combinations; and wherein the game is also over when there are just two remaining cards from said same card deck.

7. The method of claim 6, wherein the five-card hands from the same 52-card poker deck are opened.

8. The method of claim 6, wherein the method is implemented in the gaming machine by means of a software program.

9. The method of claim 6, wherein the machine is a computer.

10. The method of claim 6, wherein the gaming machine is a server on the world wide web (WWW) and the video screen is on a computer terminal connected to the WWW.

* * * * *